(12) United States Patent
Geisel et al.

(10) Patent No.: US 7,383,242 B2
(45) Date of Patent: Jun. 3, 2008

(54) COMPUTER-IMPLEMENTED METHOD AND APPARATUS FOR ITEM PROCESSING

(75) Inventors: Brian R. Geisel, Alpharetta, GA (US); William Randlett, Cumming, GA (US); Amar Verma, Alpharetta, GA (US); Jeffrey T. Chinander, Norcross, GA (US); Kavil S. Subramanian, Alpharetta, GA (US); Ranjee Gangadhar, Alpharetta, GA (US)

(73) Assignee: Alogent Corporation, Alpharetta, GA (US)

( * ) Notice: Subject to any disclaimer, the term of this patent is extended or adjusted under 35 U.S.C. 154(b) by 1221 days.

(21) Appl. No.: 09/795,670

(22) Filed: Feb. 28, 2001

(65) Prior Publication Data

US 2002/0073060 A1   Jun. 13, 2002

Related U.S. Application Data

(60) Provisional application No. 60/186,785, filed on Mar. 3, 2000.

(51) Int. Cl.
*G06F 7/00* (2006.01)

(52) U.S. Cl. .............................. 707/1; 707/3; 707/102; 712/11

(58) Field of Classification Search .............. 707/1–10, 707/500, 102; 382/283, 54, 305; 712/11
See application file for complete search history.

(56) References Cited

U.S. PATENT DOCUMENTS

| | | | |
|---|---|---|---|
| 3,800,124 A * | 3/1974 | Walsh ........................ 235/488 |
| 4,321,672 A * | 3/1982 | Braun et al. ................... 705/42 |
| 4,510,618 A * | 4/1985 | Ataman et al. ............. 382/275 |
| 5,237,159 A | 8/1993 | Stephens et al. |
| 5,349,170 A | 9/1994 | Kern |
| 5,412,190 A | 5/1995 | Josephson et al. |
| 5,532,464 A | 7/1996 | Josephson et al. |
| 5,668,897 A * | 9/1997 | Stolfo ........................ 382/283 |
| 5,689,579 A | 11/1997 | Josephson |
| 5,691,524 A | 11/1997 | Josephson |
| 5,768,416 A | 6/1998 | Lech et al. |
| 5,783,808 A | 7/1998 | Josephson |
| 5,801,366 A * | 9/1998 | Funk et al. .................. 235/380 |
| 5,812,989 A * | 9/1998 | Witt et al. ..................... 705/45 |
| 5,819,236 A | 10/1998 | Josephson |
| 5,893,078 A | 4/1999 | Paulson |
| 5,896,298 A | 4/1999 | Richter |
| 5,917,965 A | 6/1999 | Cahill et al. |
| 6,019,282 A | 2/2000 | Thompson |
| 6,041,312 A | 3/2000 | Bickerton et al. |

(Continued)

FOREIGN PATENT DOCUMENTS

FR    2749685    12/1997

*Primary Examiner*—Sathyanarayan Pannala
(74) *Attorney, Agent, or Firm*—Harness, Dickey & Pierce, P.L.C.

(57) ABSTRACT

A method and apparatus for item processing is disclosed which provides a stand alone clearing solution having an imaged enable environment for item processing and balancing. The present invention incorporates user-definable balancing control rules, balancing control levels and reconciliation algorithms for facilitating item processing. The present invention includes a data store (14) stored in memory accessible by a capture module (34), a configuration module (38), a balancing module (40), an administration module (46), a publishing module (42) and portal module (48) which provides parallel access to the data store (14) during item processing.

20 Claims, 8 Drawing Sheets

U.S. PATENT DOCUMENTS 6,059,185 A * 5/2000 Funk et al. ................. 235/379
6,097,834 A     8/2000 Krouse et al.
6,181,837 B1    1/2001 Cahill et al.
6,243,501 B1 * 6/2001 Jamali ....................... 707/500

* cited by examiner

Figure 3

COMPUTER-IMPLEMENTED METHOD AND APPARATUS FOR ITEM PROCESSING

CROSS REFERENCE TO PRIORITY APPLICATION

This application claims priority under 35 USC § 119(e) to U.S. Provisional Application No. 60/186,785 filed on Mar. 3, 2000, the disclosure of which is incorporated herein by reference.

BACKGROUND OF THE INVENTION

The present invention relates generally to item processing of commercial paper and more specifically to a turnkey computer-implemented processing solution which facilitates and expedites the clearing process of various commercial paper including but not limited to checks, drafts, money orders, credit notes, debit notes, invoices, bills, cash transaction, control tickets, remittance slips and the like.

SUMMARY OF THE INVENTION

The present invention includes a suite of innovative item processing and system integration software processing solutions. The architecture underlying these solutions is a Windows® NT/SQL service-based technological makeover of traditional, mainframe-environment item processing which eliminates the need for a separate proof and encode operation to provide a foundation upon which to build an array of downstream image products and services.

The present invention provides a innovative and completely scalable solution to address the ever evolving demands of payment processing by utilizing powerful user-defined business rules to maximize efficiency and usability.

The present invention further provides a Windows®-based solution for high-performance, mission-critical operations which delivers innovative work flows and open interfaces to drive processing efficiencies, while utilizing other current hardware and software resources.

The present invention is a stand-alone clearing solution which adopts a image-enabled environment for item processing and balancing which incorporates sophisticated balancing control rules, balancing control levels, proof limits and adjustments for wrongly-claimed, unclaimed and missing items.

The present invention provides a modern distributed architecture that is capable of evolving the processing needs and provides means to expand the product and services beyond basic item processing.

The present invention further provides an integrated "paperless" electronic work flow in which grouped transaction data records are delivered electronically instead of physically from branches to clearing centers such that physical item processing and the need to run prime (first) capture passes at a clearing center are eliminated.

BRIEF DESCRIPTION OF THE DRAWINGS

FIG. 3 is an exemplary form output from the eList Reconciliation function;

DETAIL DESCRIPTION OF THE PREFERRED EMBODIMENT

Figure 1:
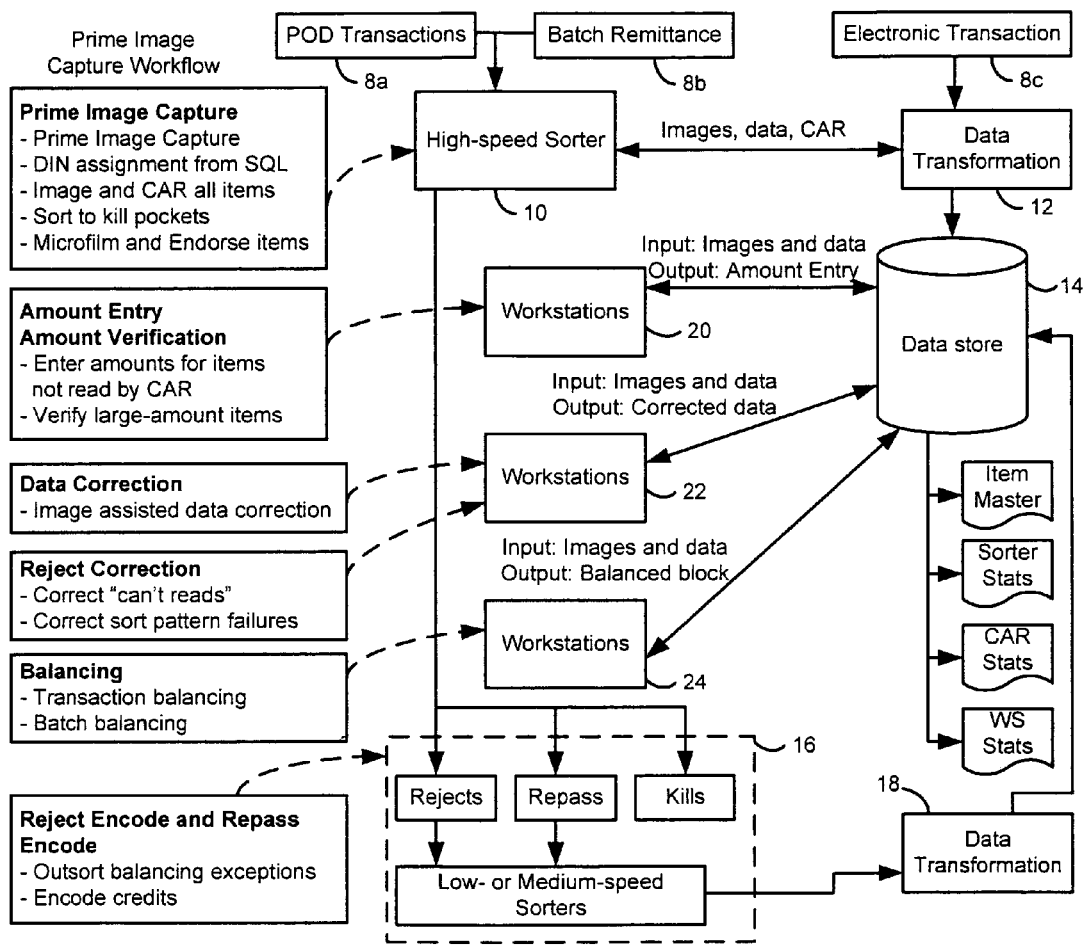
FIG. 1 is a schematic representation of item processing workflow in an image-enable environment in accordance with the present invention.

Item processing involves the data entry and processing tasks associated with commercial transactions for clearing items. More specifically and with reference to FIG. 1, transactions such as proof of deposit transactions 8a or batch remittances 8b are initially processed through a prime capture step represented at block 10 by a high speed sorter which generates electronic data in the form of a transaction data record ("TDR") based on each physical item. The TDR has image data and alphanumeric data including codeline data and a courtesy amount read value ("CAR value") associated with each physical item. At this point, the TDR is sufficient to completely represent the item such that the physical item (i.e., check) may be directed to a final destination with no further handling thereof required for clearing. As such, the present invention eliminates the burdens associated with further handling of the physical record through subsequent item processing workflow.

A transformation is performed on the TDR as represented at block 12 to convert the format of the TDR from a sorter-compatible format to an optimized data record format or unified data record ("UDR"). The transformation arranges the data fields within the TDR, as well as deciphers or parses additional data from the existing data fields. For example, image recognition functions may be performed on the image data to generate alphanumeric data that is included in the TDR. UDRs are stored in memory as a data store represented at block 14.

In some instances, certain items may require re-pass through an auxiliary capture step represented at block 16 to capture data previously rejected or to capture further detailed data or to encode the physical record. In these instances, the items are re-run through auxiliary sorters in which electronic format of the images, code line data and CAR values, as well as additional alphanumeric data may be obtained. In addition, the items may be re-passed to acquire further data from the item that was not previously obtained. The data from the auxiliary capture step is then transformed from the sorter-compatible format to the optimized data record format as indicated in block 18. Transformation 18, like transformation 12 arranges the data fields within the TDR, as well as deciphers or parses additional alphanumeric data from the existing images and data fields.

Alternately, a TDR may be the result of a paperless transaction (such as an electronic fund transfer or an e-commerce transaction) wherein the item data is already in an electronic format. In this circumstance, the TDR couples directly with the transformation function 12 for conversion to the UDR.

Data store 14 is an open architecture such that access may be gained from various physical locations, i.e., workstations, to perform item processing tasks. Data store 14 may be accessed to perform amount entry and verification functions. UDRs are accessed at workstation 20 to verify that the data fields in each record have been entered and to verify the amount associated with the UDR. Data store 14 may also be accessed to perform various data correction steps. UDRs are accessed at workstation 22 where parsed item data, codeline data and CAR values can be visually compared with image data and corrected, if necessary. Data store 14 may further be accessed to perform various balancing functions. UDRs are accessed at workstation 24 and compiled into a structured hierarchy that are balanced according to predefined balancing control rules and balancing control levels.

Figure 2:
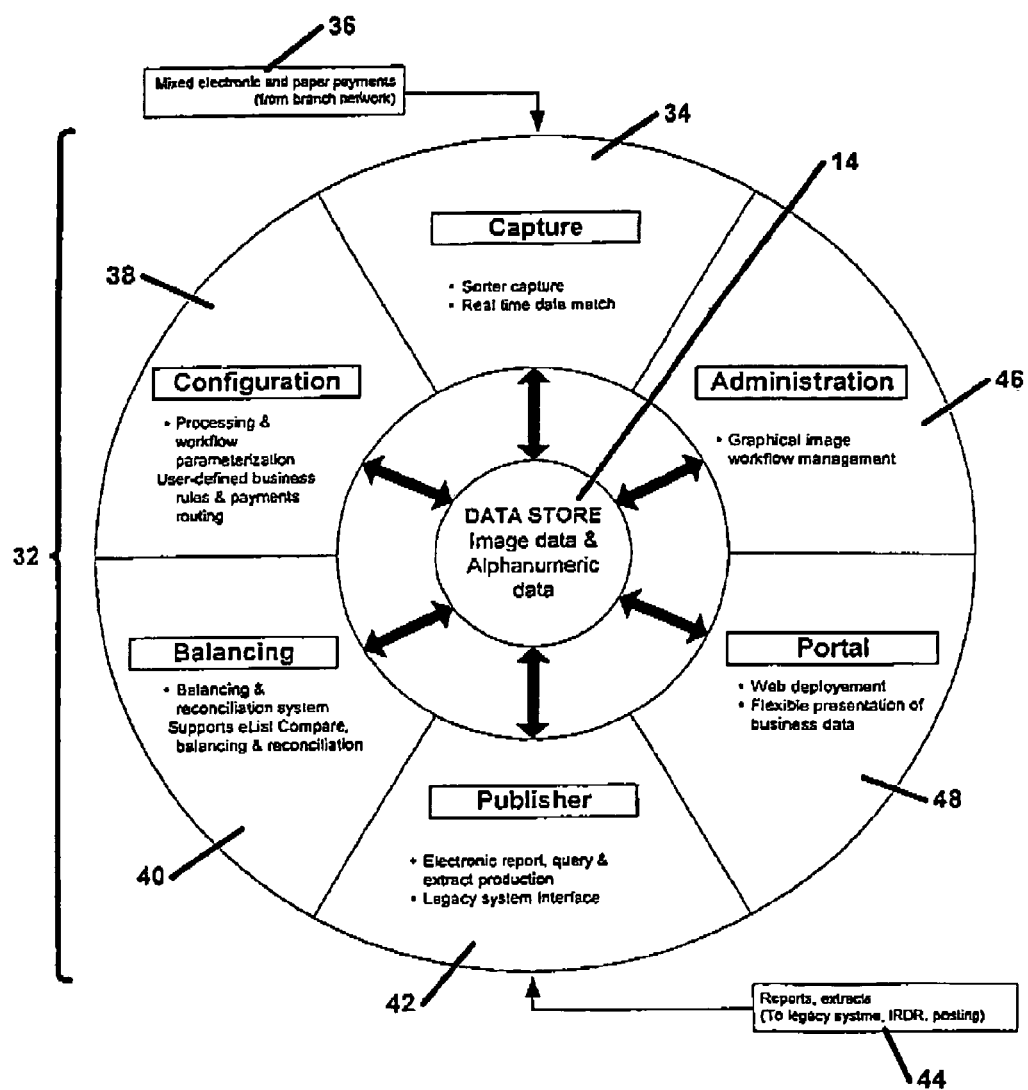
FIG. 2 is a schematic representation of the interrelationship between various components of the present invention.

With reference now to FIG. 2, a graphic representation of the clearing solution is provided. The wheel 32 illustrates the interrelation of various program modules to the open architectural solution provided by the present invention. The relational data store 14 is represented as a circle located at the center of wheel 32. The blocks arranged radially outwardly from data store 14 represent processing algorithms or modules that interact with data store 14 during item processing workflow.

Block 34 represents an interface or prime capture module utilized during the prime image capture function 10 and auxiliary capture function 16 illustrated in FIG. 1. During these steps, the programming solution interfaces with various hardware, such as item sorters, to collect document data in the form of item image data, code line data and CAR values. In this manner, the paper item (i.e., the check) is processed through the sorter to generate the TDR. Block 34 further operates to transform the data from the hardware specific format to the preferred open database format or UDR stored in data store 14. The sorter specific data is graphically represented in block 36 as an input to capture processing function 34.

Capture function 34 also encompasses a real time data match including the amount entry/verification on UDRs as represented in block 20 of FIG. 1 and the data correction on UDRs as represented at block 22 of FIG. 1. In this regard, simultaneous review of the image and alphanumeric data facilitates the amount entry, amount verification and data correction tasks.

Block 38 represents an interface or configuration module between data store 14 and the prime capture module 34 that allows the user to configure the processing parameters and work flow parameters of a specific application. In other words, configuration module 38 defines the environment for the specific sorter as well as the type and location of data fields provided from such hardware and the type, location and format of data of the UDR. Configuration module 38 further defines the specific routing of physical items, TDRs and UDRs. For example, transactions that require auxiliary capture processing are defined in configuration module 38.

Figure 3:
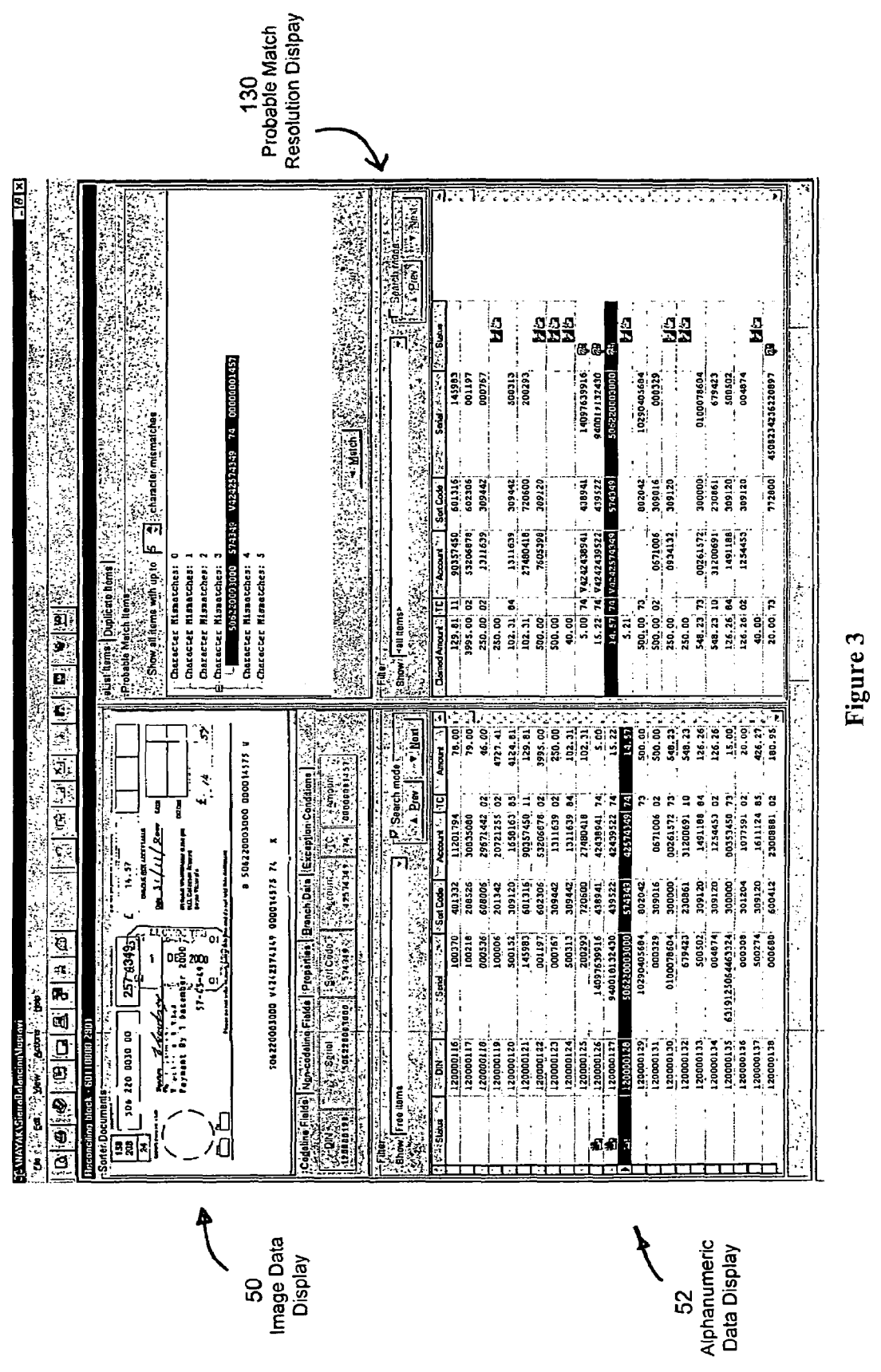

With reference again to FIG. 2, the programming solution of the present invention includes an item balancing module 40 for balancing and reconciling imaged data with the alphanumeric data. As presently preferred, the process includes a visual reconciliation procedure in which the operator can visually resolve unmatched documents using an automatic probable match resolution display. A display of the visual reconciliation format is illustrated in FIG. 3. In this regard, the balancing process component replaces the item master list in more conventional item processing techniques that required a comparison of the physical item with its associated electronic data. Furthermore, the present invention affords greater adaptability in that access to the complete data record including image data shown in display 50 and alphanumeric data shown in display 52 is provided as opposed to just CAR value and/or codeline data. As a result, the user can visually resolve unmatched documents using an automatic probable match resolution display that is linked to a full display of items in the electronic add list or eList.

The item balancing module includes a probable match resolution algorithm which interrogates each UDR to insure that the image file associated with that UDR corresponds directly to the alphanumeric data fields thereof. In certain circumstances, the image data may not have corresponding alphanumeric data associated with it (i.e., a "free" record). Alternately, the data record may not have the corresponding image files associated with it (i.e., a "missing" record). By utilizing a software comparison between the associated image portion of the record and alphanumeric data portion of the record, a probable match function may be generated which identifies a list of the most likely matches between image records and data records in the order of highest probability. From this point, the user may select one of the displayed suggestions, or may choose an unmatched item from the electronic adds list to complete the reconciliation process. As the user navigates through the probable match items, the electronic add list is updated to show the current selection in context with the other items in the electronic add list.

Figure 4:
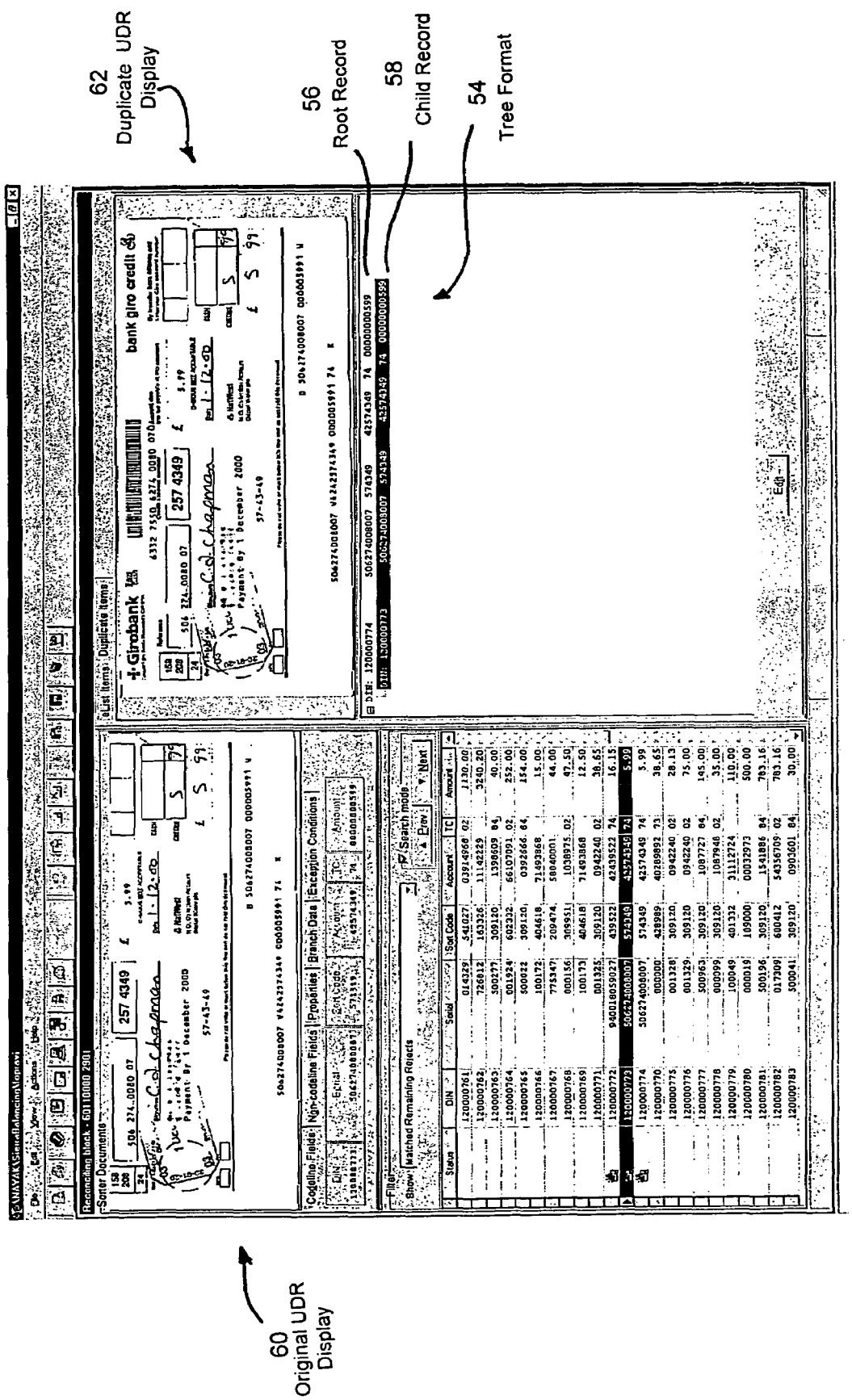
FIG. 4 is an exemplary output from the Duplicate Items function.

A related function involves the resolution of duplicate check entries. It is often critical to insure that items are not duplicated within the data store 14. The present invention employs a duplicate check identification algorithm to insure that there are no duplications within a collection of UDRs. More specifically, a list of all duplicate items within a collection is compiled and displayed in a readable format as illustrated in FIG. 4. A comparison function is preformed on the transaction records to identify probable duplicate sets within the collection. Next, a duplicate identification function is performed to identify the original document and all duplicates thereof. The alphanumeric data of items so identified are displayed in a tree format 54, with a UDR displayed as a root 56, and all duplicates thereof displayed as children 58 of that root. In addition, the image data of the original UDR and duplicate UDR are displayed in displays 60 and 62, respectively. In this regard, the final UDR is used as the original record because that UDR is normally the one retained within the collection, while all others are deleted. The user may then choose and delete the UDRs from the tree view so that the item processing operations will proceed properly. In this regard, the present invention has the advantage over conventional clearing operations in that the duplicate check resolution may be conducted prior to the final reconciliation steps. As a result, the balancing and reconciliation process is greatly expedited.

With reference again to FIG. 2, the present invention includes a process administration component or module represented at block 46 that simplifies allocation of the processing resources as a function of the work flow dynamics. More specifically, in any clearing operation, certain points may represent bottlenecks to efficient work flow. For example, one of the workstations 20, 22, or 24 may lag in the processing sequence such that the work flow rate is not optimized. The processing administration module 46 provides real-time feedback in the form of statistical processing numbers that enables quick assessment of the workflow efficiency. A graphical interface refreshes approximately four times per minute to provide feedback as to the workflow. Using this information, the administration module can allocate and reallocate clearing resources or tasks performed thereby to optimize the work flow efficiency.

The present invention includes an information publishing component or module 42 for extracting information represented at block 44 from data store 14 in a usable format. As presently preferred, the publishing module 42 allows reports to be generated and end-user defined configurations, as well as formatted data files to be output for use in post processing utilities such as electronic spread sheets and word processing programs. Further compilation and summary of information relating to the items processed through the clearing operation can be generated from such output.

The present invention further includes a portal module 48 that provides an access or window into data store 14 for users outside of the item processing work flow. In this manner, queries may be made of data store 14 to determine the status of given transactions. For example, data store 14 may be queried to determine the status of a check on which a "stop pay" order has been issued. Similarly, queries on the status of an item associated with an account having insufficient funds may be made for purposes of evaluating subsequent handling thereof. Also, individual UDRs including the image data may be queried to determine the accuracy of the signature block on that item. Notwithstanding the access to the database, the portal module 48 is external to the item processing work flow, and thus does not impede or implicate the primary function thereof.

As discussed above, item processing requires that data acquired from disparate sources be compared, matched, and reconciled accurately. The data matching logic must cope with data that is presented from multiple hardware devices and software sources. Each of these sources may have different methods for deciphering the printed characters on a check, and therefore may present different representations of the same data.

The present invention incorporates confidence-based codeline matching logic to cope with the differences in these data formats. Specifically, confidence-based codeline matching logic provides an algorithm to resolve unreadable characters between versions of check codelines, especially those captured during multiple sorter passes. There are various reasons why the same check would be read differently on subsequent sorter passes than on the first pass, most having to do with the capabilities and condition of the hardware. When codelines are captured differently, the result is usually that one of the captured codelines contains representations of unreadable characters. In such circumstances, the sorter hardware will generate a special character to identify any single character that it could not decipher from the printed item codeline.

The process of confidence-based codeline matching logic can be used to resolve unreadable characters. Given the two values "123456" and "123?56", where "?" is an unreadable character, there is a high confidence level that the actual value of the unreadable character is "4". The same applies in reverse, where the two values are "1?3456" and "123456", there is a high confidence level that the unreadable character in the first field should be "2". However, if the values were "???456" and "123???", a comparison of the two field does not result in a reasonable confidence that one is related to the other.

Confidence-based codeline matching algorithm of the present invention applies a confidence value to each field (of which there are usually four or five fields on a US check), and the individual confidence values are summed to derive an overall confidence value for the check's codeline. The individual confidence values are related to an unreadable character count for each field. The confidence value for the codeline allows the software to identify codelines that should not be used for codeline matching. When the confidence in the codeline is below a defined limit, there are too many unreadable characters in the codeline to allow it to be compared against other codelines during the data matching process.

Table 1 sets forth exemplary confidence parameters wherein each codeline field has an unreadable character limit and an associated confident value. If the number of unreadable characters in a field is less than or equal to the limit, then the confidence value associated with the field is added to the total confidence for the codeline. The total confidence must be equal to or greater than a limit set for the codeline. If the value is below the limit, then the codeline data is ignored during the data match process. All of the confidence parameters, i.e., values and limits, may be user-defined and can be adjusted by software implementation.

TABLE 1

| CODELINE FIELD | UNREADABLE CHARACTER LIMIT | CONFIDENCE VALUE |
|---|---|---|
| Amount | 3 | 2 |
| Transaction Code | 1 | 1 |
| Account Number | 2 | 3 |
| Bank Number (RT) | 1 | 2 |
| Auxiliary On-us | 1 | 1 |

Figure 5:
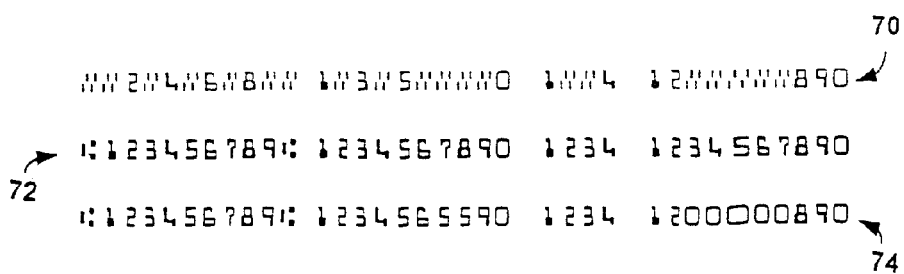
FIG. 5 is exemplary codeline data processed by the confidence-based check data matching engine of the present invention.

FIG. 5 illustrates three lines of codelines data 70, 72, 74 in which the ',' character is used to represent an unreadable number. Each codeline data has an amount field, a transaction code field, an account number field and a bank number field, and may also have an Auxiliary On-us field. It would be very difficult to compare codeline 100 with codelines 102, 104 and have a reasonable expectation of finding a unique match. In fact, there is no way to determine if codeline 70 matches codeline 72 or codeline 74. Codeline 100 is the type that the confidence-base matching excludes from the matching process.

The search algorithm for the data matching search process of the present invention is optimized for speed by using a binary search of the codeline data followed by a sequential search of the codeline data. The binary search identifies the location of a codeline that matches the target codeline, and the sequential search looks for similar codelines that might also match the target codeline. In traditional data match searching, only the sequential search is performed.

The speed of the search is important for the present invention because of the volume of items that are processed. In some cases, a codeline must be matched to a data store of 3 million codelines, and the match success or failure must be determined in milliseconds. In order to accomplish this, a codeline table is created as a binary linked list that is sorted according to the character values of the codeline fields. This creates a table that can be used to support a binary search. Within the table, unreadable characters are all replaced with the ASCII value 255 to ensure a consistent sort order.

As each individual codeline is prepared for data matching, the process determines if there are unreadable characters in the codeline. If there are no unreadable characters, then the data match search process is straightforward. A binary search is performed for the matching codeline that is either found or not found. If no matching codeline is found, then a sequential or linear search is performed from the point where the binary search completed. If the linear search fails to find a match, then the codeline cannot be matched automatically and is marked to indicate that condition.

If there are unreadable characters in the codeline, then two binary searches are performed. First, all of the unreadable characters are substituted with the ASCII value 0 and a search is performed. Then another search is performed with the ASCII value 255 substituted for unreadable characters. This provides a range of possible matches within the codeline table. Once the range is identified, a sequential or linear search process is employed to find any matching codelines. The linear search process involves ignoring the unreadable characters to the extent that is allowed by the confidence-based data matching described previously.

The present invention incorporates a data patterning engine for implementing business-related rules including data validation, data routing and data transformation. The data patterning engine employs a simple scripting language that allows end-users to define business rules for data validation, data routing and data transformation. Binary-search table trees are created from the scripted business rules for high-speed execution of the rules on the order of less than 10 milliseconds. The data patterning engine also provides predefined and user-definable data keys for arguments. More specifically, the scripting language allows a user to extract a portion of a data field or formulate a concatenated data field from existing data fields. For example, an end user may define a data key which comprises the last four digits of an account number data field. Likewise, the arguments which define decision parameters based on the state of a data key are configurable. In this manner, the user-defined arguments may be configured to take a specified action if a data key has a given field defined thereby. The data patterning engine also provides for check-digit definition and verification of data based on such check-digit definition. The data patterning engine further provides customized data routing end points for outputting the data in a recipient-specific format. The data patterning engine also allows for user-definable endorsements such that a given data field or a data key may be printed on an item of outgoing data. The endorsements may be unique at any user-defined level down to the item level. Implementation of business-related rules are made through a tree-based user interface which define the data keys, arguments, check-digits, endpoints and endorsements.

The present invention includes a message engine architecture that provides means for dynamically substituting named variables with their corresponding data values at runtime. The variables themselves fall into the categories of 'static variable' and 'dynamic variable'. The names for static variables and the value for the variable are defined through an initialization file. The names of dynamic variables are pre-defined within the application, and the value determined at run-time through several layers of indirection. The message engine architecture allows these variables to be presented to the end-user for use in configuring the application system, and provides for easy customization of text display within the system.

Figure 6:
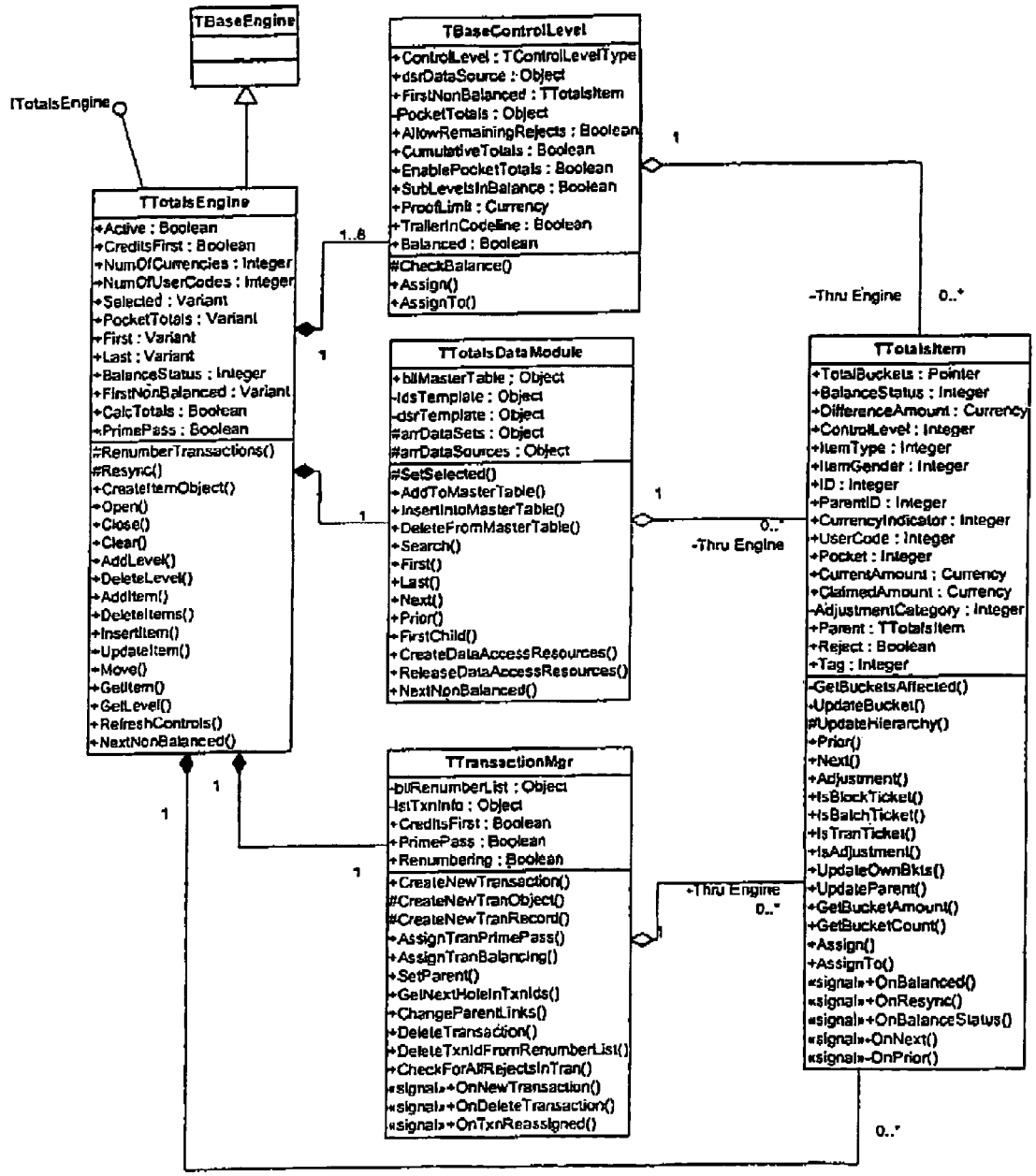
FIG. 6 is a UML diagram of the Totals Engine Function.

The present invention incorporates a Totals Engine that computes and maintains totals for a specific hierarchy of control levels up to a maximum of 8 levels. The Totals Engine of the present invention is represented in unified modeling language ("UML") format in FIG. 6. The Totals Engine provides an interrelationship between individual UDRs and larger groupings thereof. This hierarchy may be controlled for up to a maximum of 8 levels. For example, the Totals Engine could be configured to down load codelines and create transactions based on a credit first or debit first transaction logic. Furthermore, the Totals Engine enables inserts, deletes, adjustments, and changes to individual TDRs at any level and applies those changes to the entire parent hierarchy.

As presently preferred, the Totals Engine provides means for implementing the balancing business rules for each control level that is customized through software code. The Totals Engine is further configured to log errors and important operations for debugging purposes and to handle errors and exceptions in standard ways. Once an initial item capture has been performed, the Totals Engine can be used at any stage of processing the balancing business rules.

Figure 7:
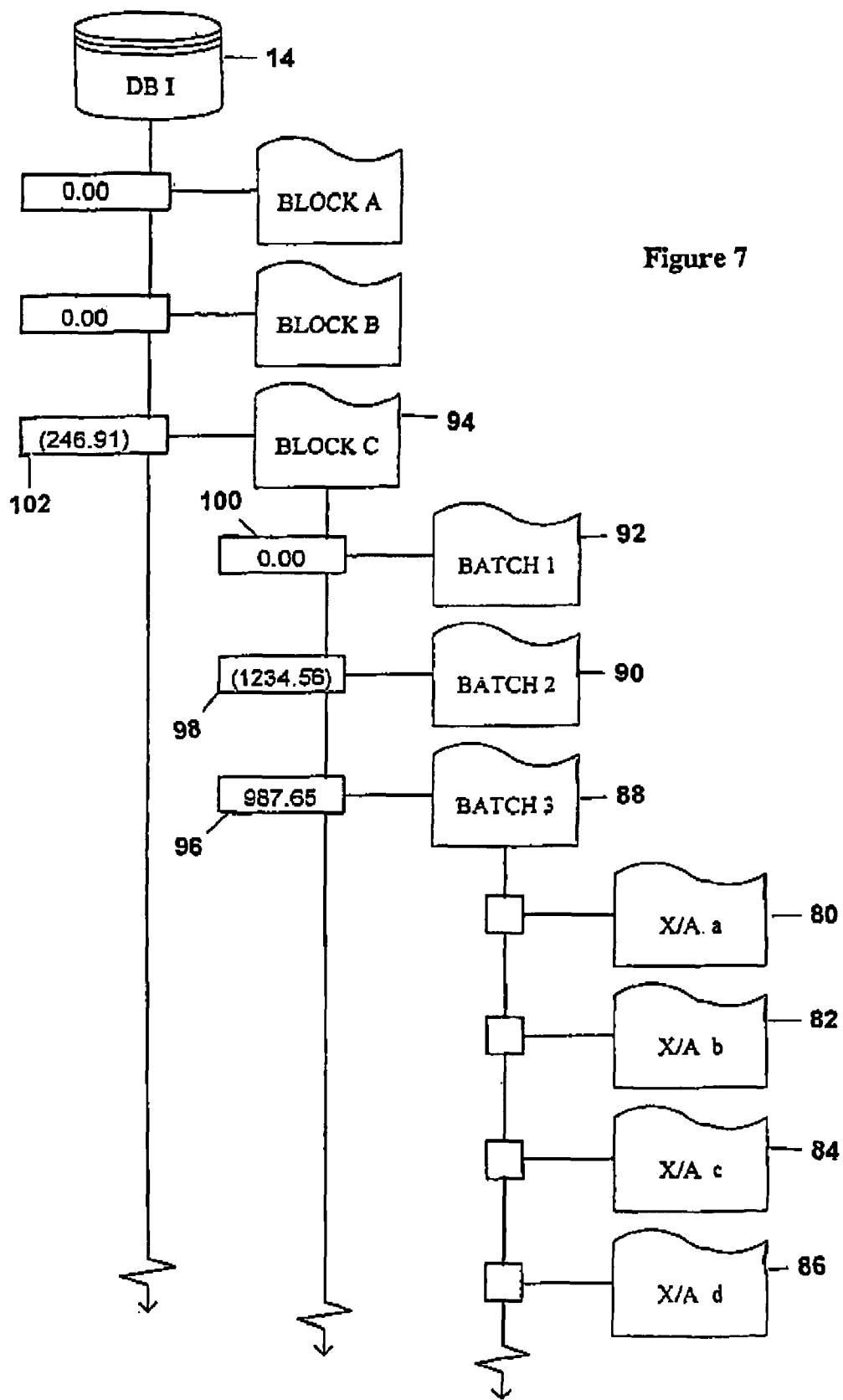
FIG. 7 is graphical representation of the Balancing Totals Tree Display.

A complement to the Totals Engine is the Balancing Totals Tree 78 that provides a visual representation of the balancing status using a tree structure that identifies all totals and subtotals. As illustrated in FIG. 7, a plurality of UDRs 80-86 are associated under a subgroup of transactions such as $BATCH_3$ 88. Similarly, a series of batches e.g., $BATCH_1$ 90 and $BATCH_2$ 92 are associated with $BATCH_3$ 88 under a group of transactions such as $BLOCK_C$ 94. The totals at each level are available for display in a hierarchical manner. Each node of the tree identifies the state of that node, i.e. either in-balance or out-of-balance. If a node is out-of-balance, the amount of imbalance is shown at that node in the tree view. For example, node 96 of $Batch_3$ 88 shows an out-of-balance condition of +987.65. Node 98 of $Batch_2$ 90 shows an out-of-balance condition of −1234.56. Node 100 of $Batch_1$ 92 shows an in-balance condition. Likewise, node 102 of $Block_C$ 94 sums the balance conditions of all batches grouped thereunder to show an out-of-balance condition of −246.91. In this manner, a user can select a node and immediately view the transactions associated with that node. This allows easy identification of problem areas and quick navigation to these errors in order to correct the imbalance condition.

The present invention utilizes an unlimited hierarchy of objects that can be streamed as a variant array or an XML string from a source component to a target component where the tree of objects is recreated. This feature enables the use of objects (or an object hierarchy) in both components with built-in data-transfer functionality using any communication protocol.

The data transformation functions 12, 18 of the present invention incorporates a simply dynamic field display algorithm to represent the codeline data is in real-time as read from physical paper. The algorithm can accept various data types from disparate hardware such as check reading devices, and parses the input into a unified representation. The Simple Dynamic Field Display algorithm further can be used to describe an item as it is represented by the item reading device, thereby allowing the input format and field parsing to be customized. The Simple Dynamic Field Display algorithm also provides options for the display and editing of the data fields from the data record, so that all software components can be programmed to the same interface, thereby masking the complexity of parsing the codeline data. The majority of the options associated with configuring the simple dynamic field display algorithm are set, and thereby defined, in a simple text file such as a windows .ini file. In this manner, the programming solution has a dynamic configuration capability resulting in flexibility for location of the fields, number of the fields, the number of spacers and other options associated with the comparability with various item reader devices.

The present invention provides a way for a single software product to interface with sorters from multiple vendors.

Since there is no standard that is set by the industry for a common API, vendors do not use a common technology (i.e. an ActiveX component versus a DLL versus a class library). Additionally, the present invention must be able to be tested quickly and without the extensive use of expensive sorters. Accordingly, an emulator is used when a sorter is not available.

A single ActiveX component is created which encapsulates all of the required functionality while presenting a single programming interface. Layers of classes encapsulate the external interfaces at different levels, allowing the ActiveX component to isolate the functions for each interface while still presenting a single, reusable programming interface.

Figure 8:
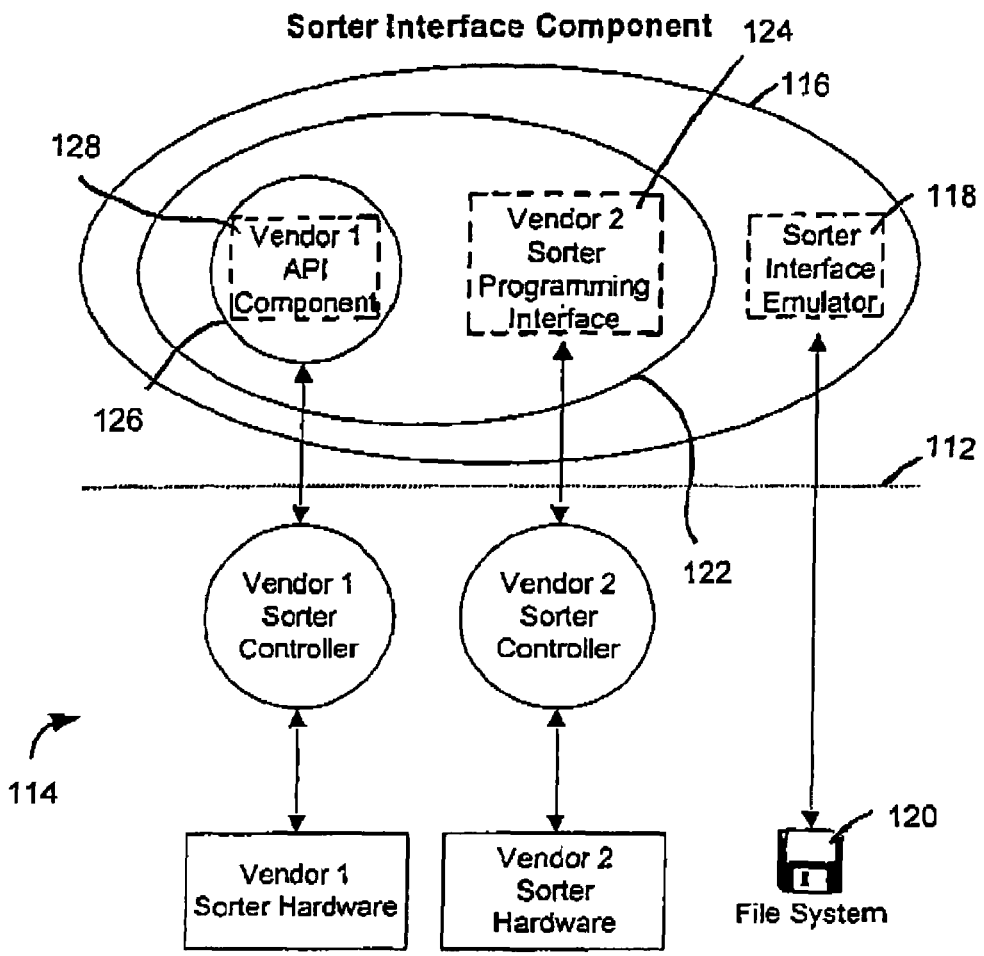
FIG. 8 is a schematic representation of the Layered Sorter Programming Interface.

The conceptual model for the sorter interface component of the present invention is illustrated in FIG. 8. The sorter interface component 110 lies above line 112, while the external interfaces 114 lie below line 112. The present invention can use the interface component 110 without knowing anything about the hardware to which it is linked. This makes the sorter emulator very useful because there are no special workarounds required for implementation. As a result, the program can be exercised through its normal logic, even when no sorter is attached.

Each layer in FIG. 8 represents a class that encapsulates an interface to an external device. The outermost layer 116 houses the emulator interface 118 which communicates with an emulator file system 120. If the emulator 118 is not being used, then control is passed to the next layer 122 that houses a programming interface 124 for Vendor 2's sorter. If Vendor 2's sorter is not being used then control is passed into the next layer 126, which houses a programming emulator 128 for Vendor 1's sorter. Additional layers can be added to encapsulate the interfaces for more vendors, without affecting the interface between the component and its associated program.

As previously discussed, the present invention incorporates a method for easily reconciling physical paper to electronic data records. Unmatched documents are visually resolved using an automatic probable match resolution display, which is linked to a full display of the electronic add list shown in FIG. 3. The probable match resolution display provides the user with a list 130 of the most likely matches to the image 50 for a physical document, in order of likelihood. The user may select one of the displayed items in list 130 or may choose any unmatched item from the electronic add list display 52. When the user navigates through the probable match display by selecting items, the electronic add list is updated to show the current selection in context with the other electronic add list.

Figure 9:
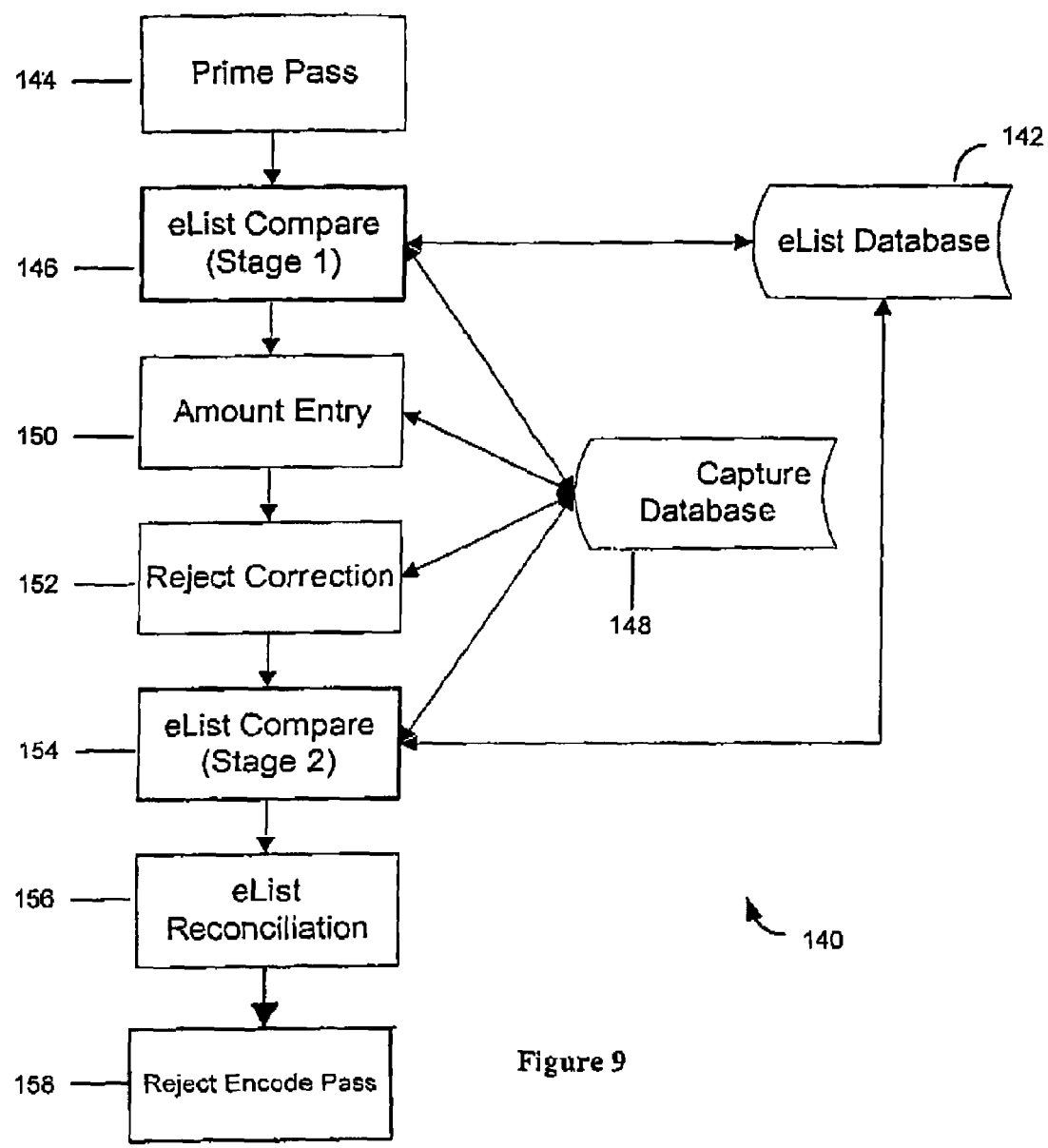
FIG. 9 is a graphical representation of the eList workflow.

The eList Reconciliation workflow starts at a remote location, e.g., branch bank, Where item data is first captured and the codeline information is saved as an electronic add-list file. The eList workflow as schematically illustrated in flow chart 140 of FIG. 9 is initiated using the electronic add-list file and the original paper items. At this point, the electronic add-list file has been transferred by a data transformation service to the eList data store 142 and stored in memory. The first task is to run a prime pass on the sorter as represented at block 144. Using the eList sort pattern, the image capture module will process the items at block 146 and store the data in the capture database 148. Next, a first state of eList Compare is performed at block 146. This process is the first codeline matching process that attempts to reconcile the electronic add-list file with the items processed on the sorter and stored in the capture data store 148.

After the first stage of eList Compare is complete at block 146, the data records are queued for Amount Entry at block 150 and Reject Corrections at block 152 on the data correction workstations. After all the data correction is complete, the second stage of eList Compare at block 154 attempts to match items and further reconcile the electronic add-list file to the sorter documents.

When the second stage of eList Compare is complete at block 154, the work is ready for eList Reconciliation at block 150. Sets of data records will be presented in random order unless a specific set is selected for reconciliation. Because the matching algorithm has already been executed in several stages, the number of items to match during reconciliation is minimized. For added flexibility, codeline data may be entered to make adjustments for items that are incorrect or misplaced, to relocate items to correct transactions, and to remove duplicate items.

In eList Reconciliation, any remaining rejects are corrected, duplicate items are resolved, prime free items are matched with the eList missing items, true free items are identified, and adjustment codes are assigned. Once eList Reconciliation is complete, the items may optionally be run in a Reject Encode pass represented at block 158 on a sorter to encode the correct amounts and sort the items to a given endpoint.

The Publishing Engine of the present invention provides a framework wherein the system generates pre-defined 'events' are defined for periodic tasking to be performed when such events occur. For example, scheduling of reports within the system may be executed upon completion of eList reconciliation for a collection of records. The link between events and reports is user-configurable, providing complete flexibility when the report is to be provided (in relation to the defined events) and the content of the report produced. Since the present invention utilizes an open, architecture pre-defined reports can be scheduled, in addition to any user defined reports or any executable can be scheduled to execute when the prescribed event occurs.

Figure 10:
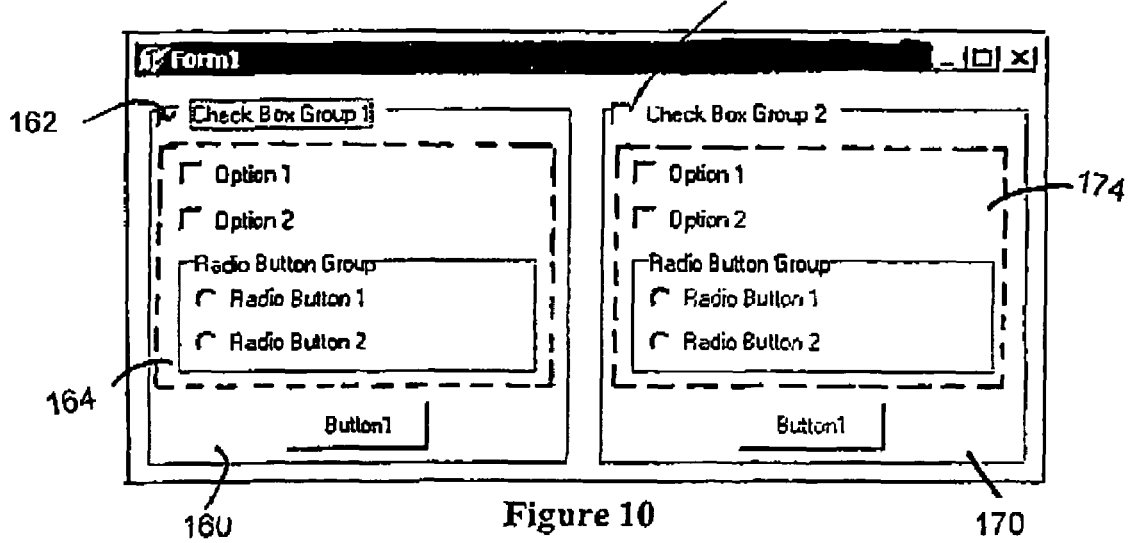
FIG. 10 is a graphical representation of the Group Check Box function.

In a related aspect of the present invention, a software development tool is provided which facilitates the selection and programming of various user-defined options. Specifically, the present invention includes a check box group function having a reusable visual control for automatically applying features of a Windows®-type check box to a group of other components. The check box group function represents a self-contained DLL-type file utilized in the Delphi software environment for enabling or disabling a group of components, based on whether a single box is selected (i.e., checked or unchecked). With reference to FIG. 10, when an options box 162 of check box group 160 is checked, the remaining components 164 that are within the group 160 are enabled as illustrated. Conversely, when an option box 172 of a check box group 170 is unchecked, all of the components 174 within the group 170 are disabled as illustrated. As a result, the checked box group component increases the speed of the software development by grouping option together and encapsulating functionality that would otherwise have to be programmed each time a group of components is associated with a single check box.

From the foregoing description, one skilled in the art will readily recognize that the present invention provides a method and apparatus for item processing of commercial paper. While the present invention has been described with reference to a preferred embodiment, certain changes, modifications and variations may be made without departing from the spirit and scope of the present invention as define by the following claims.

What is claimed is:

1. An image-enabled item processing system for commercial paper comprising:
   a data store for storing a plurality of unified data records in a memory;
   an image capture module interfaced between said data store and a data collection mechanism, said image capture module having:
   a data collection algorithm collecting a transaction data record including commercial transaction data representative of a commercial transaction item;
   a transformation algorithm to transform said transaction data record into a unified data record, said unified data record including an image portion and an alphanumeric portion of said commercial transaction data representative of said commercial transaction item;
   a transmission algorithm to store said unified data record in said data store; and
   a verification algorithm having an interface for visually reviewing said image portion of said unified data record to verify said alphanumeric portion against said image portion;
   a configuration module interfaced between said image capture module and said data collection mechanism, said configuration module having:
   a definitional algorithm to define an environment for said data collection mechanism;
   a transformation format between said environment and said unified data record; and
   a routing algorithm defining a routing path of said unified data record through said system;
   an item balancing module interfaced with said data store, said item balancing module having:
   a compiling algorithm for arranging said plurality of unified data records into a structured hierarchy in accordance to a set of user-defined business rules;
   a reconciliation algorithm for reconciling said plurality of unified data records in said structured hierarchy in said data store; and
   a probable match resolution algorithm for making a recommended match between an unmatched item and a free item in said data store, said probable match resolution algorithm interrogating said data store and generating a state indicator for each of said plurality of unified data records wherein each of said state indicators is selected from the group including a free state wherein said unified data record includes said image portion but not said alphanumeric portion, a missing state wherein said unified data record includes said alphanumeric portion but not said image portion, and a complete state wherein said unified data record includes said image portion and said alphanumeric portion.

2. The image-enabled item processing system of claim 1 wherein said item balancing module further comprises a duplicate data identification algorithm which interrogates said alphanumeric portion of each of said plurality of unified data records, and compiles a list of duplicate data records, and displays said list of duplicate data records including an original data record being displayed as a root and at least one duplicate data record being displayed as a child of said root such that said at least one duplicate data record is capable of being deleted from said data store.

3. The image-enabled item processing system of claim 1 further comprising an administration module interfaced with said data store to monitor work flow between said data store, said image capture module and said item balancing module to provide a parameter for assessing a work flow efficiency, said parameter being displayed in a graphical format which is periodically refreshed.

4. The image-enabled item processing system of claim 1 further comprising an information publishing module interfaced with said data store to extract a portion of said plurality of unified data records and generate an output therefrom.

5. The image-enabled item processing system of claim 1 further comprising a portal module interfaced with said data store to provide external access to said data store to query said data store without implicating said data store or a module interfaced therewith.

6. A method for item processing of commercial paper comprising the steps of:
   collecting a transaction data record including commercial transaction data representative of a commercial transaction item;
   transforming said transaction data record into a unified data record, said unified data record including an image portion and an alphanumeric portion of said commercial transaction data representative of said commercial transaction item;
   storing said unified data record in a memory to form a data store having a plurality of unified data records;
   interrogating said data store to determine a state indicator for each of said plurality of unified data records wherein said state indicator is selected from the group including a free state wherein said unified data record includes said image portion but not said alphanumeric portion, a missing state wherein said unified data record includes said alphanumeric portion but not said image portion, and a complete state wherein said unified data record includes said image portion and said alphanumeric portion;
   generating a probable match recommendation between an unmatched item and a free item in said data store based on said state indicators;
   arranging said plurality of unified data records into a structured hierarchy in accordance to a set of user-defined business rules; and
   reconciling said plurality of unified data records in said structured hierarchy.

7. The method of item processing of claim 6 further comprising the steps of:
   interrogating said alphanumeric portion of each of said plurality of unified data records;
   compiling a list of duplicate data records; and
   displaying said list of duplicate data records including an original data record being displayed as a root and at least one duplicate data record being displayed as a child of said root such that said at least one duplicate data record is capable of being deleted from said data store.

8. The method of item processing of claim 6 further comprising the steps of:
   monitoring said unified data record through the steps of item processing and generating a parameter for assessing a work flow efficiency thereof;
   displaying said parameter in a graphical format; and
   periodically refreshing said graphical format.

9. The method of item processing of claim 6 further comprising the steps of extracting a portion of said plurality of unified data records and generating an output therefrom.

10. The method of item processing of claim 6 further comprising the steps of providing an external access to said data store for querying said data store without implicating said data store or a work flow of said plurality of unified data records stored therein.

11. A system for processing financial records, the system comprising:
   a record creation module for converting a transaction data record including commercial transaction data representative of a commercial transaction item into a plurality of unified data records, said unified data records being stored in a data store and including an image portion and an alphanumeric portion of said commercial transaction data representative of said commercial transaction item;
   a first set of said unified data records comprising at least one image portion;
   a second set of said unified data records comprising at least one alphanumeric portion;
   a balancing module for reconciling said image portion and said alphanumeric portion of said unified data records stored in said data store in accordance with a set of user-defined rules; and
   a probable match module for generating a highest probability match between said first set and said second set of said unified data records.

12. The system of claim 11 wherein said probable match module determining a highest probability match for each one of said image portions from said first set with said alphanumeric portions of said second set of said unified data records.

13. The system of claim 11 where in said probable match module determining a highest probability match for each one of said alphanumeric portions from said second set with said image portions of said first set of said unified data records.

14. The system of claim 11 further comprising:
   a duplicate check module for determining the duplicates among said unified data records and communicating the presence of the duplicates among said unified data records to a user.

15. The system of claim 11 wherein the probable match module further comprising:
   a probable match resolution algorithm for making a recommended match between an unmatched item and a free item in said data store, said probable match resolution algorithm interrogating said data store and generating a state indicator for each of said plurality of unified data records wherein each of said state indicators is selected from the group including a free state wherein said unified data record includes said image portion but not said alphanumeric portion, a missing state wherein said unified data record includes said alphanumeric portion but not said image portion, and a complete state wherein said unified data record includes said image portion and said alphanumeric portion.

16. The system of claim 11 wherein said unified data records are arranged in said data store in a structured hierarchy in accordance to a set of user-defined business rules.

17. The system of claim 16 wherein a batch of said transaction data is grouped in said structured hierarchy.

18. The system of claim 16 wherein said probable match algorithm performs a binary search of said data store based on a composite data key associated with each said unified data record.

19. The image-enabled processing system of claim 1 further comprising a probable match resolution display module which displays a plurality of highest probability matches, such that a match for a free item in said data store can be selected from the group including identified probable matches and unmatched items.

20. The image-enabled processing system of claim 1 wherein said interface for visually reviewing said image portion of said unified data record to verify said alphanumeric portion against said image portion further comprises a correction module which allows said unified data records to be corrected.

* * * * *